(12) United States Patent
De La Grandmaison et al.

(10) Patent No.: US 7,594,796 B2
(45) Date of Patent: Sep. 29, 2009

(54) ROTORCRAFT BLADE PROVIDED WITH A TILTABLE FLAP AND A FASTENER TONGUE

(75) Inventors: François Lorin De La Grandmaison, Hennebont (FR); Michel Morant, Bouc Bel Air (FR); Jacques Gaffiero, Paris (FR)

(73) Assignee: Eurocopter, Marignane (FR)

( * ) Notice: Subject to any disclaimer, the term of this patent is extended or adjusted under 35 U.S.C. 154(b) by 449 days.

(21) Appl. No.: 11/585,209

(22) Filed: Oct. 24, 2006

(65) Prior Publication Data

US 2007/0098554 A1 May 3, 2007

(30) Foreign Application Priority Data

Oct. 26, 2005  (FR) .................................. 05 10917

(51) Int. Cl.
*B64C 9/00* (2006.01)
(52) U.S. Cl. ....................................................... 416/24
(58) Field of Classification Search .................. 416/23, 416/24; 244/212–217
See application file for complete search history.

(56) References Cited

U.S. PATENT DOCUMENTS

| 2,776,718 | A | 1/1957 | Zuck |
| 6,454,207 | B1 | 9/2002 | Yamakawa et al. |
| 2002/0021964 | A1 | 2/2002 | Janker et al. |

FOREIGN PATENT DOCUMENTS

FR  2 770 826  5/1999

*Primary Examiner*—Ninh H Nguyen
(74) *Attorney, Agent, or Firm*—Young & Thompson

(57) ABSTRACT

The present invention relates to a rotorcraft rotor blade (1) that comprises at least one tiltable trailing-edge flap (5), said flap (5) being suitable for pivoting about a virtual hinge axis (Y') extending substantially in the span direction of said blade (1) and of said flap (5). The blade (1) is remarkable in that the flap (5) is provided with at least two fastener ball joints (30), each provided with an inner cage (32) together with an outer cage (33) and a first pin (31) that is also secured to said flap (5), the first pins (31) of the fastener ball joints (30) being perpendicular to the virtual pivot axis (Y') of the flap (5). In addition, the blade (1) is provided at its trailing edge (BF) with a fastener tongue (20) provided with ball-receiving sockets (21), the outer cages (33) of the fastener ball joints (30) being secured to the ball-receiving sockets (21).

9 Claims, 2 Drawing Sheets

ROTORCRAFT BLADE PROVIDED WITH A TILTABLE FLAP AND A FASTENER TONGUE

The present invention relates to an active blade for a rotorcraft, the blade being provided at its trailing edge with a fastener tongue and with a tiltable flap that is controlled locally by an electromechanical device.

BACKGROUND OF THE INVENTION

In order to improve the aero-acoustic, vibratory, and aerodynamic performance of the blades of a main lift and advance rotor of a rotorcraft, it is advantageous to place a tiltable flap in the trailing edge of each blade, which flap is conveniently referred to as a trailing edge flap.

The angle through which the flap can be tilted relative to the blade is of the order of ±10° at a frequency of about 30 hertz (Hz). To be effective, the angle of tilt varies actively over time as a function of numerous parameters such as the position of the blade about the axis of the main rotor, referred to as the "azimuth" position, the speed of rotation of the main rotor, and the pitch, beating, and lag movements of the blade.

Given the dimensions of the blade and the stresses that act on the flap and the blade due to the beating, lag, and pitch movements thereof, it will readily be understood that there are difficulties to be overcome in obtaining a flap that is reliable, lightweight, and capable of satisfying the expectations of the manufacturer and of users.

Patent document US 2002/0021964 discloses a first type of blade provided with a flap. The top and bottom portions of the leading edge of the flap are convex in shape, while the central portion of the leading edge is concave in shape. The leading edge of the flap is thus ϵ-shaped.

In addition, the top and bottom portions are each connected to an actuator, while the concave central portion is placed against a bearing element secured to the blade. Consequently, by actuating one or the other of the actuators, the flap can be caused to tilt about the bearing point so as to present the desired inclination.

Nevertheless, under the effect of the stresses exerted on the blade and on the flap in flight, in particular those caused by beating movements, there is a risk of the flap sliding along the bearing point which could lead to premature wear, or even, in a worse-case scenario, to the flap becoming jammed, thereby making it unusable and dangerous.

Furthermore, it can readily be seen that the overall shape of the flap, and more particularly of its leading edge, is not optimized from an aerodynamic point of view and that might possibly lead to noise or vibration disturbance and to degraded aerodynamic performance.

U.S. Pat. No. 6,454,207 discloses a second type of blade having a trailing edge flap.

The flap is secured to the blade about a longitudinal shaft, i.e. extending along the span of the blade, which shaft passes through the blade. Consequently, the flap can pivot about the longitudinal shaft, being driven by a connecting rod secured to the pressure side of the flap via a crank, and itself controlled by an actuator. The connecting rod is thus situated in part outside the blade-and-flap assembly, which is harmful to overall aerodynamics. In addition, discontinuity is observed between the flap and the blade which can lead to a reduction in aerodynamic performance and also to a whistling effect due to air flowing between the flap and the blade.

In this second type of architecture, the means enabling the flap to pivot about a shaft still present the drawback of it being possible for the flap to jam. It should not be forgotten that the mechanical stresses acting on the flap and the blade in flight are very large. Consequently, there is a non-negligible risk of the shaft being deformed, and under such circumstances the flap could then no longer be tilted to the desired angle of inclination.

Finally, patent document FR 2 770 826 discloses a third type of blade fitted with a flap. The flap is not connected to the blade via a longitudinal shaft, but via two stub axles located on either side of the flap. In addition, the flap is provided with a flexible arm that is positioned inside the blade, being connected via a lever to a set of two rotary motors acting on coaxial eccentrics. Using that set of two rotary motors, the device controls the angle of inclination of the flexible arm, and thus of the flap.

Nevertheless, as for the second type of blade, the stub axles about which the flap tilts do not appear to present sufficient overall robustness to guarantee proper operation of the system over a reasonable length of time.

OBJECTS AND SUMMARY OF THE INVENTION

An object of the present invention is to propose an active blade provided with a flap and a fastener tongue enabling the above-mentioned limitations of blades to be overcome.

Furthermore, it should not be forgotten that the blades of rotorcraft are extremely thin, i.e. the relative thickness of blade sections is small, such that the thickness of the blade is small, very particularly in the vicinity of the trailing edge of the blade where thickness decreases. Thus, the maximum thickness of the flap is about 20 millimeters (mm). Under such circumstances, it goes without saying that the device for causing the flap to tilt relative to the blade must be compact in order to be capable of being housed within the blade and/or the flap.

Furthermore, as mentioned above, it is important for the assembly to be robust in order to avoid premature wear or even jamming of the flap, which might be catastrophic.

Finally, in order to reduce the inertial forces exerted on the blade and the flap, it is essential for the weight of the assembly to remain as small as possible.

According to the invention, a rotorcraft rotor blade includes at least one tiltable trailing-edge flap, said flap being suitable for pivoting about a virtual hinge axis extending substantially in the span direction of said blade and of said flap. The blade is remarkable in that the flap is provided with at least two fastener ball joints, each provided with an inner cage together with an outer cage and a first pin that is also secured to said flap, the first pins of the fastener ball joints being perpendicular to the virtual pivot axis of the flap. In addition, the blade is provided at its trailing edge with a fastener tongue provided with ball-receiving sockets, the outer cages of the fastener ball joints being secured to the ball-receiving sockets.

The fastener ball joints then constitute pivots about which the flap is capable of pivoting in order to present the desired angle of inclination relative to the blade.

This configuration is very original since the first pin of each fastener ball joint does not coincide with the virtual hinge axis for flap pivoting, and is not even directed along said axis. On the contrary, the first shaft is advantageously perpendicular to the virtual hinge axis and substantially perpendicular to the plane of the chords of the flap, i.e. it is directed approximately across the thickness of the flap. This is of great importance insofar as it then becomes possible to arrange a fastener ball joint in a space that is nevertheless very constricted.

The use of such a fastener ball joint makes it possible to satisfy the problem given the reputation for robustness of such mechanical equipment. In addition, there is no longer any need to provide the flap with a longitudinal shaft or with stub axles in order to allow it to pivot, thereby limiting any risk of the flap jamming.

Advantageously, the blade has a suction side face and a pressure side face, which faces meet at a trailing edge of the blade in order to form the tongue, in particular so as to obtain a tongue that is rigid. The stiffness of the tongue makes it possible to avoid any significant loss of effectiveness of the flap by preventing a return moment that would otherwise be induced by a flexible tongue.

Similarly, the blade having a rib in the proximity of its trailing edge, the tongue is situated substantially halfway up the rib.

Under such conditions, the trailing edge of the blade is mechanically strong, which is not negligible.

Furthermore, the flap includes an opening provided with a bottom lip and a top lip, said tongue being arranged between the top and bottom lips when said flap is secured to said blade. The bottom and top lips then describe an angular field of about 20° to enable the flap to present the required angles of inclination relative to the blade.

The angle of inclination of the flap relative to the blade is controlled with the help of at least one control arm secured to the flap and controlled by a linear or rotary actuator arranged in the blade. Consequently, when the actuator causes the arm to take up an angle of inclination, that leads to the flap directly taking up an angle of inclination of the same kind by pivoting about the ball-receiving sockets of the tongue because of the fastener ball joints therein.

Furthermore, the tongue is of great importance for aerodynamic and acoustic reasons. It avoids any discontinuity between the flap and the blade, thus preventing air from flowing between them. This advantage is maximized when the tongue extends along the entire span of the flap, i.e. when the tongue is at least as long as the flap. Nevertheless, given the presence of at least one control arm, the tongue comprises at least two distinct portions disposed on either side of a control arm.

Finally, in order to optimize aerodynamic and aero-acoustic performance, the tongue includes a flexible tape, e.g. of elastomer, at its free end, i.e. at the end of the tongue that is situated beside the trailing edge of the flap rather than beside the trailing edge of the blade.

BRIEF DESCRIPTION OF THE DRAWINGS

The invention and its advantages appear in greater detail from the following description given with reference to the accompanying figures that show preferred embodiments without any limiting character. In the figures.

MORE DETAILED DESCRIPTION

Elements that are shown in more than one of the figures are given the same references in all of them.

Figure 1:
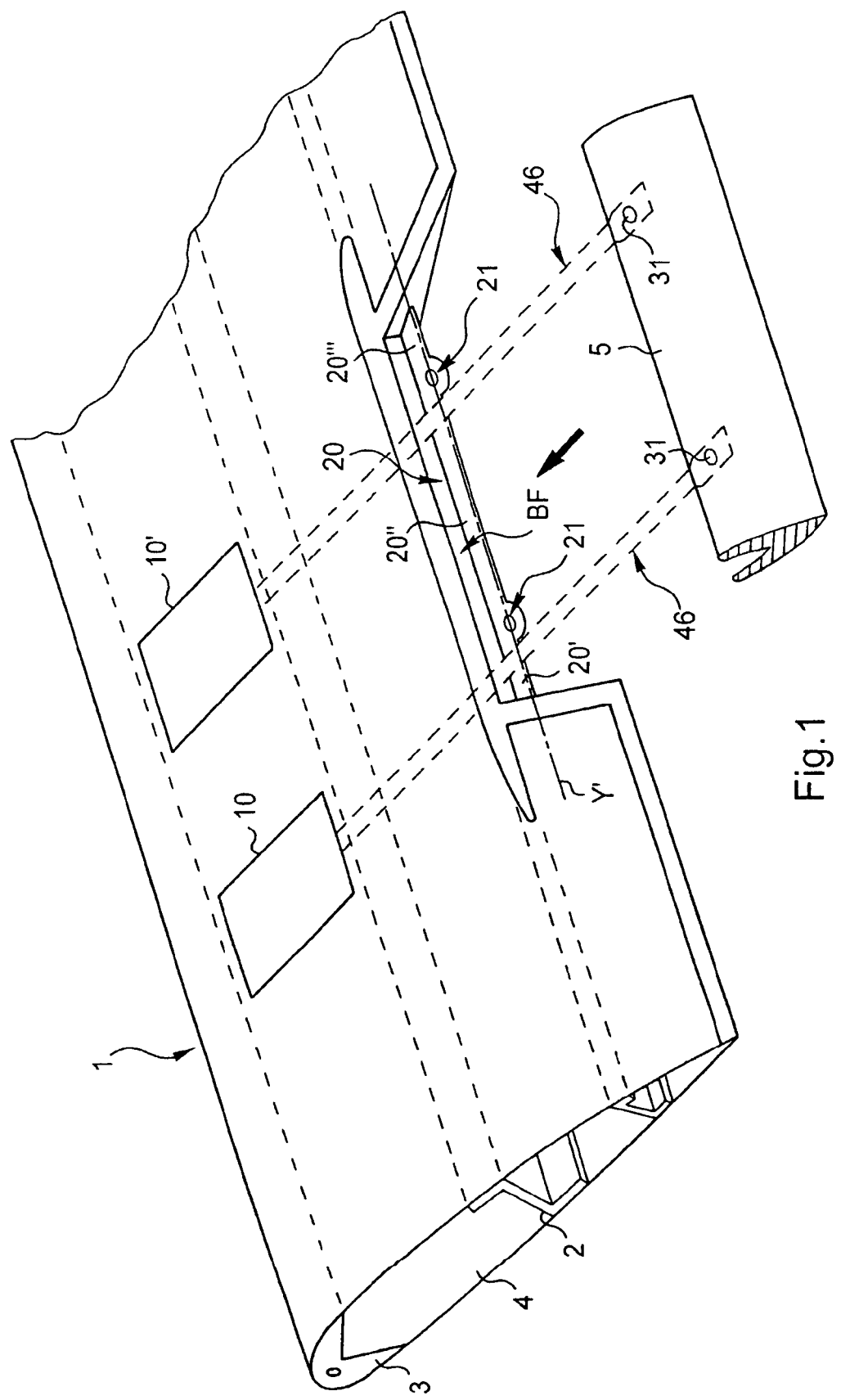
FIG. 1 is a diagrammatic section of a blade fitted with a flap.

FIG. 1 is a diagrammatic view of a blade fitted with a flap in accordance with the invention.

A rotorcraft blade 1 is provided with a trailing edge flap 5. In addition, two electromechanical actuators 10 and 10' are arranged inside the box 4 of the blade 1 which lies between the front spar 3 and the rib 2 of the blade 1.

The actuators 10 and 10' enable the trailing edge flap 5 to pivot about a virtual hinge axis Y', each acting via a respective control arm 46 secured to the flap, for the purpose of improving the aero-acoustic, aerodynamic, and vibratory performance of the blade 1. The actuators are themselves controlled by an electronic unit (not shown in the figures) that delivers the control relationship for the flap (tilt angle/frequency) as a function of the flight configuration of the rotorcraft. The actuators 10, 10' are also powered electrically via slip rings disposed in the rotor of the rotorcraft and via an electrical circuit integrated in the blade 1 along its span.

In active mode, position sensors deliver signals to the electronic unit so as to enable it to servo-control the flap. In certain flight configurations, the system can be in a passive mode, with the flap 5 then remaining stationary in a neutral position in line with the basic profile of the blade 1.

Depending on requirements, one or more flaps are arranged along the blade 1, preferably in the vicinity of the blade tip cap, i.e. towards the free end of the blade. Similarly, depending on requirements, some other number of actuators could be provided.

The flap 5 is secured to the blade 1 via two fastener ball joints (not shown in FIG. 1), and via a tongue 20 arranged at the trailing edge BF of the blade 1. Each fastener ball joint comprises an inner cage and an outer cage together with a first pin 31, the outer cages being secured to ball-receiving sockets 21 of the tongue.

In order to prevent air passing between the flap 5 and the blade 1, the tongue 20 extends along the entire span of the flap 5.

Nevertheless, in order to allow the control arms 46 to pass, the tongue comprises a plurality of portions 20', 20", 20''', with pairs of adjacent portions 20'-20", 20"-20''' having a control arm 46 passing between them. As a result, there is no discontinuity, since air is prevented from passing between the flap 5 and the blade 1 either by a portion of tongue or else by a control arm.

Figure 2:
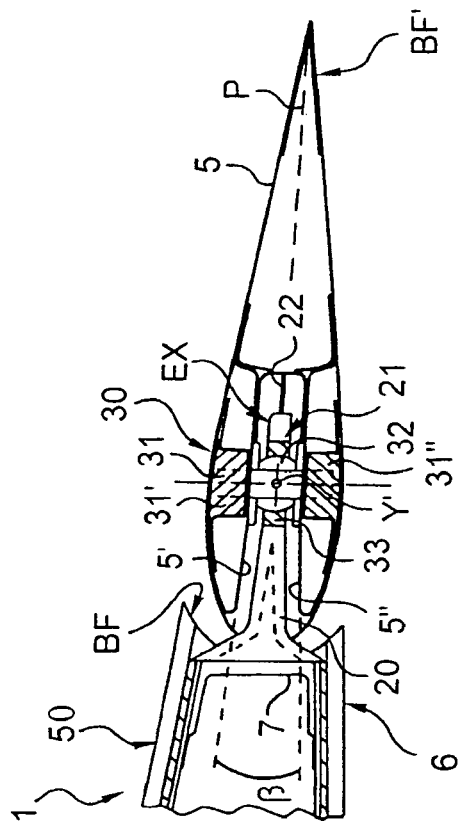
FIG. 2 is a section of FIG. 1, showing a zone of the flap that is provided with a fastener ball joint.

FIG. 2 is a section of FIG. 1, showing a zone of the flap 5 that is provided with a fastener ball joint.

The suction side and pressure side surfaces 50 and 6 of the blade 1 meet at the trailing edge BF so as to form the tongue 20. It should be observed that the trailing edge BF presents the flap 5 with a face that is concave, thereby improving overall aerodynamics.

In addition, in particular for the purpose of making it easier to tilt the flap 5, the tongue 20 is situated halfway up the rib 7 that is situated at the trailing edge BF of the blade 1.

Similarly, since the flap 5 is provided with an opening having a top lip 5' and a bottom lip 5", the tongue is arranged between the top and bottom lips 5' and 5". Under such conditions, the top and bottom lips 5' and 5" describe an angular field β of about 20°, so as to allow the flap 5 to take up the required angles of inclination.

In addition, the flap 5 has a fastener ball joint 30 provided with an inner cage 32, an outer cage 33, and a first pin 31.

The first pin 31 is secured to the flap 5, with tilting of the first pin 31 leading to tilting of the flap 5, and vice versa. Consequently, the first pin 31 passes part of the way through the flap 5, so that its ends are secured to the flap 5 via respective nuts 31' and 31", for example. In addition, and preferably, the first pin 31 is substantially perpendicular to the virtual hinge axis Y' and to the plane P of the chord of the flap 5, the first pin 31 then extending across the thickness of the flap 5.

In this context, the flap 5 is connected to the blade 1 via the outer cage 33 of the fastener ball joint 30. More precisely, the outer cage 33, which contains the inner cage 32, is secured to the ball-receiving socket 21 so as to constitute a ball inserted therein, the outer cage 33 being secured to the tongue 20.

In order to limit wear of the fastener ball joints 30, they are, where necessary, prestressed in order to take up any slack between their inner and outer cages 32 and 33.

The centrifugal forces that act on the assembly comprising the flap and the fastener ball joints exert natural prestress on the fastener ball joints in the span direction of the blade. If the level of this prestress is high enough, then the inner and outer cages 32 and 33 of the fastener ball joints 30 remain permanently in contact in spite of the other forces (dynamic, aerodynamic, and control) to which they are subjected in the chord direction of the blade.

However, if the level of stress that is provided naturally by centrifugal forces is not sufficient, then the fastener ball joints 30 are prestressed mechanically. Consequently, the blade then includes a spring type device inserted between the flap 5 and the trailing edge BF of the blade 1, serving to exert a force continuously tending to move the flap 5 away from the trailing edge of the blade, for example.

Finally, the free end EX of the tongue 20 is provided with a flexible tape 22, e.g. made of elastomer, with this free end being beside the trailing edge BF' of the flap 5 rather than beside the trailing edge BF of the blade 1.

This tape is particularly useful in that it prevents air flowing between the flap 5 and the blade 1, with this taking place more precisely between the free end EX of the tongue 20 and the flap 5. In addition, because of its flexibility, the flexible tape 22 does not run any risk of impeding tilting of the flap 5.

Figure 3:
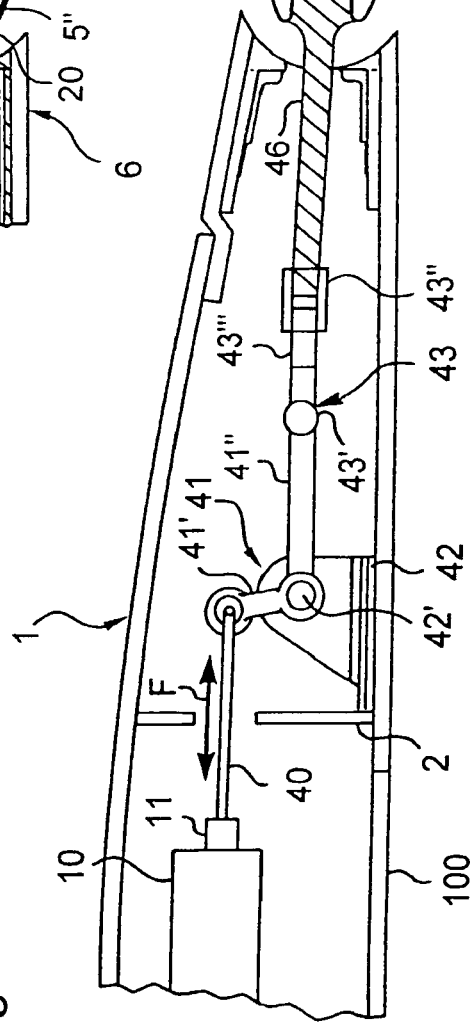
FIG. 3 is a section of FIG. 1, showing a zone of the flap that is provided with a control arm.

FIG. 3 is a section of FIG. 1 showing a zone of the flap 5 that is provided with a first embodiment of the control arm.

Whatever the embodiment, the control arm 46 is secured to the flap 5, e.g. by being embedded therein at the time of manufacture. Titling the control arm 46 thus causes the flap 5 to tilt in the same manner.

In the first embodiment, the actuator 10 is of the linear type, having an end 11 suitable for moving along an axis X as represented by double-headed arrow F. It should be observed that an access hatch 100 is provided in the pressure side face of the blade 1 to enable maintenance operations to be performed on the actuator 10, for example.

The transmission linkage serving to connect the actuator 10 to the flap 5 comprises in succession: a first connecting rod 40; a bended crank 41; an extensible flexible pivot 43; and the control arm 46.

The first connecting rod 40, which also passes through the rib 2, is secured firstly to the end 11 of the actuator, and secondly to the crank 41, and more particularly to the primary arm 41' of the crank 41.

Furthermore, the bend of the crank 41 is secured to a support 42 by means of a through shaft 42', the support 42 being secured to the rib 2. Thus, the crank 41 can pivot about the through shaft 42'.

The secondary arm 41" of the crank 41 is connected to the control arm 46 via a flexible pivot 43. Pivoting of the crank 41 consequently causes the control arm 46 to tilt and thus causes the flap 5 to tilt, given the structure described above.

In addition, it will readily be understood that the distance between the through shaft 42' and the control arm 46 is constant. The same applies to the length of the crank 41 and the length of the control arm 46. In order to make tilting possible, it is therefore essential for the flexible pivot to allow for lengthening substantially along the axis X. That is the reason why, for convenience, it is referred to as an extensible flexible pivot.

The extensible flexible pivot 43 thus comprises an ordinary simple pivot 43', a threaded sleeve 43", and a rod 43'''. The simple pivot is connected firstly to the secondary arm 41" of the crank 41 and secondly to the rod 43'''. This rod 43''' is engaged in the threaded sleeve 43", itself secured to the control arm 46. The sliding engagement of the rod 43''' in the threaded sleeve then allows the rod 43''' to move relative to the threaded sleeve 43" along the axis X.

In a second embodiment that is not shown in a figure, the actuator is of the rotary type. A device, e.g. a device of the type described above, that allows for lengthening along the axis X is then disposed between the control arm 46 and the rotary actuator.

Figure 4:
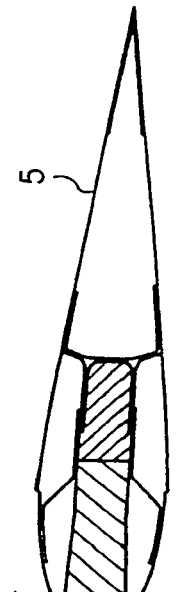
FIG. 4 is a section of FIG. 1, showing a zone of the flap including neither a fastener ball joint nor a control arm.
Figure 4:
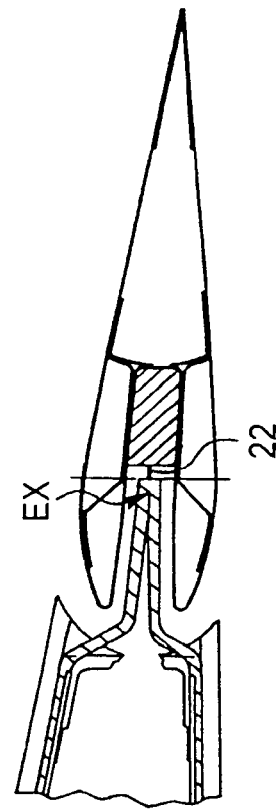

FIG. 4 is a section of FIG. 1 in a zone of the flap 5 that has neither a fastener ball joint 30 nor a control arm 46.

It can then be seen that the free end EX of the tongue 20 is provided with a flexible tape 22, as explained above for the zone shown in FIG. 2.

Naturally, the present invention is capable of being implemented in a wide variety of ways. Although several embodiments are described above, it will readily be understood that it is not conceivable to identify exhaustively all possible embodiments. Naturally, it is possible to envisage replacing any of the means described by equivalent means without going beyond the ambit of the present invention.

What is claimed is:

1. A rotorcraft rotor blade (1) having at least one tiltable trailing-edge flap (5), said flap (5) being suitable for pivoting about a virtual hinge axis (Y') extending substantially in the span direction of said blade (1) and of said flap (5), wherein said flap (5) includes at least two fastener ball joints (30) each provided with an inner cage (32) together with an outer cage (33) and a first pin (31) secured to said flap (5), said blade being provided at its trailing edge (BF) with a fastener tongue (20) provided with ball-receiving sockets (21), said outer cages (33) of the fastener ball joints (30) being secured to said ball-receiving sockets (21), wherein said first pin (31) of each fastener ball joint (30) is perpendicular to said virtual pivot axis (Y') of said flap (5).

2. A blade according to claim 1, wherein said blade (1) has a suction side face (50) and a pressure side face (6), with said side faces (50 and 6) meeting at the trailing edge (BF) of said blade (1) in order to form said tongue (20).

3. A blade according to claim 1, wherein said tongue (20) is rigid.

4. A blade according to claim 1, wherein said flap (5) includes an opening provided with a bottom lip (5") and a top lip (5'), said tongue (20) being arranged between said top and bottom lips (5', 5") when said flap (5) is secured to said blade (1).

5. A blade according to claim 4, wherein said bottom and top lips (5", 5') describe an angular field β of about 20°.

6. A blade according to claim 1, wherein the angle of inclination of said flap (5) relative to said blade (1) is controlled with the help of at least one control arm (46) secured to said flap (5), said control arm (46) being controlled by an actuator (10, 10') arranged in said blade (1).

7. A blade according to claim 6, wherein said tongue (20) extends along the span direction of said flap (5), with said tongue (20) comprising at least two distinct portions (20', 20", 20''') that are separated by a control arm (46).

8. A rotorcraft rotor blade (1) having at least one tiltable trailing-edge flap (5), said flap (5) being suitable for pivoting about a virtual hinge axis (Y') extending substantially in the span direction of said blade (1) and of said flap (5), wherein said flap (5) includes at least two fastener ball joints (30) each provided with an inner cage (32) together with an outer cage (33) and a first pin (31) secured to said flap (5), said blade being provided at its trailing edge (BF) with a fastener tongue (20) provided with ball-receiving sockets (21), said outer cages (33) of the fastener ball joints (30) being secured to said ball-receiving sockets (21), wherein said blade (1) has a rib (7) in the proximity of its trailing edge (BF), with said tongue (20) being situated substantially halfway up said rib (7).

9. A rotorcraft rotor blade (1) having at least one tiltable trailing-edge flap (5), said flap (5) being suitable for pivoting about a virtual hinge axis (Y') extending substantially in the span direction of said blade (1) and of said flap (5), wherein said flap (5) includes at least two fastener ball joints (30) each provided with an inner cage (32) together with an outer cage (33) and a first pin (31) secured to said flap (5), said blade being provided at its trailing edge (BF) with a fastener tongue (20) provided with ball-receiving sockets (21), said outer cages (33) of the fastener ball joints (30) being secured to said ball-receiving sockets (21), wherein said tongue (20) includes a flexible tape (22) at its free end (EX).

* * * * *